W. J. CHANCE.
NAVIGATION APPARATUS.
APPLICATION FILED JULY 15, 1907.
938,972.
Patented Nov. 2, 1909.
5 SHEETS—SHEET 5.
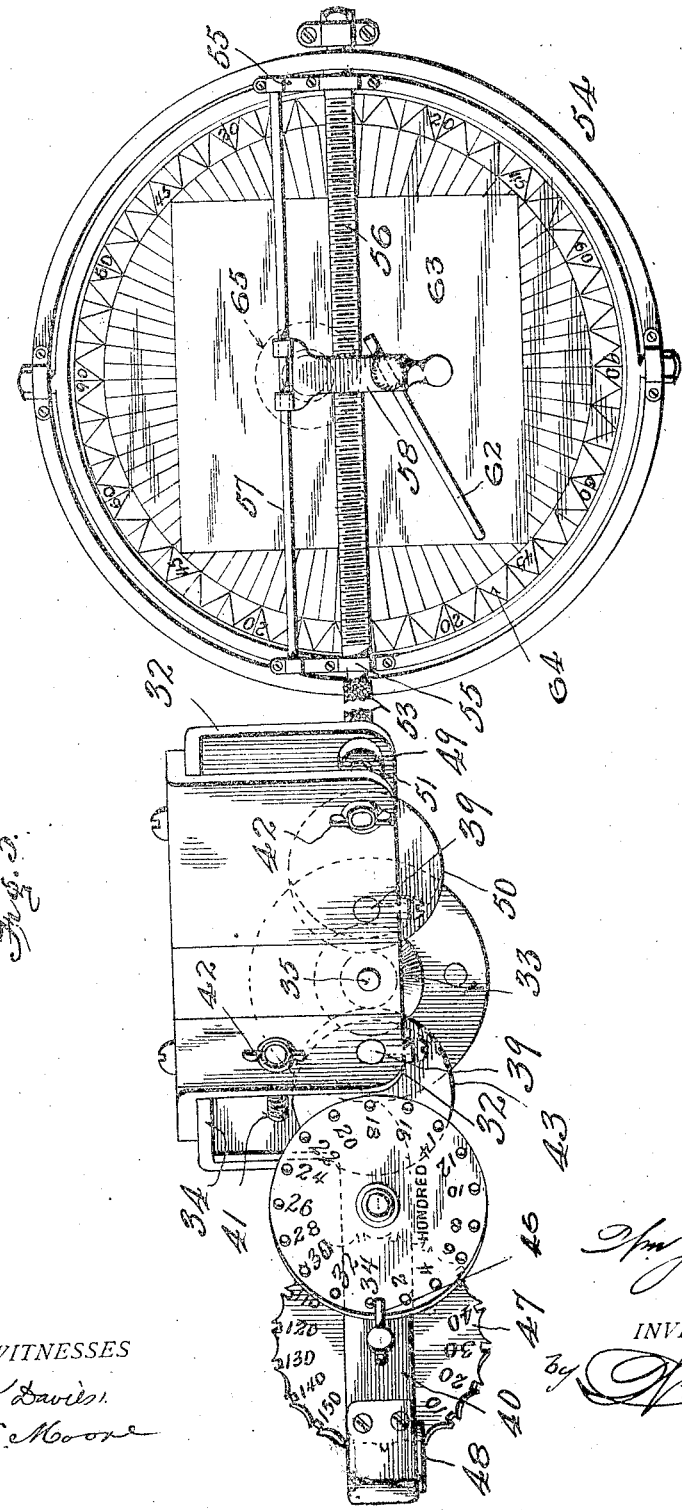
WITNESSES
Chas. N. Davis.
M. E. Moore
INVENTOR
Wm. J. Chance
by
Attorney

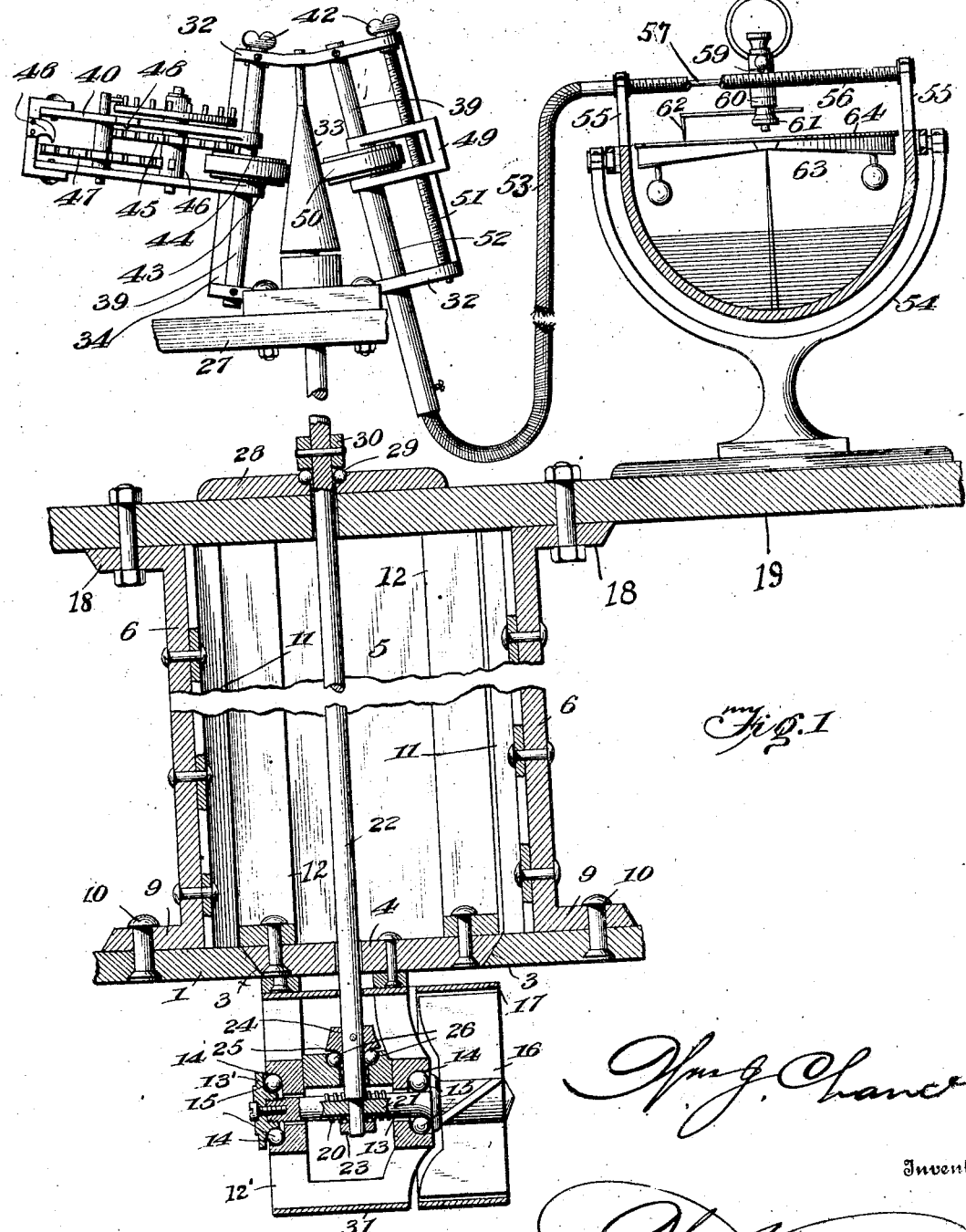

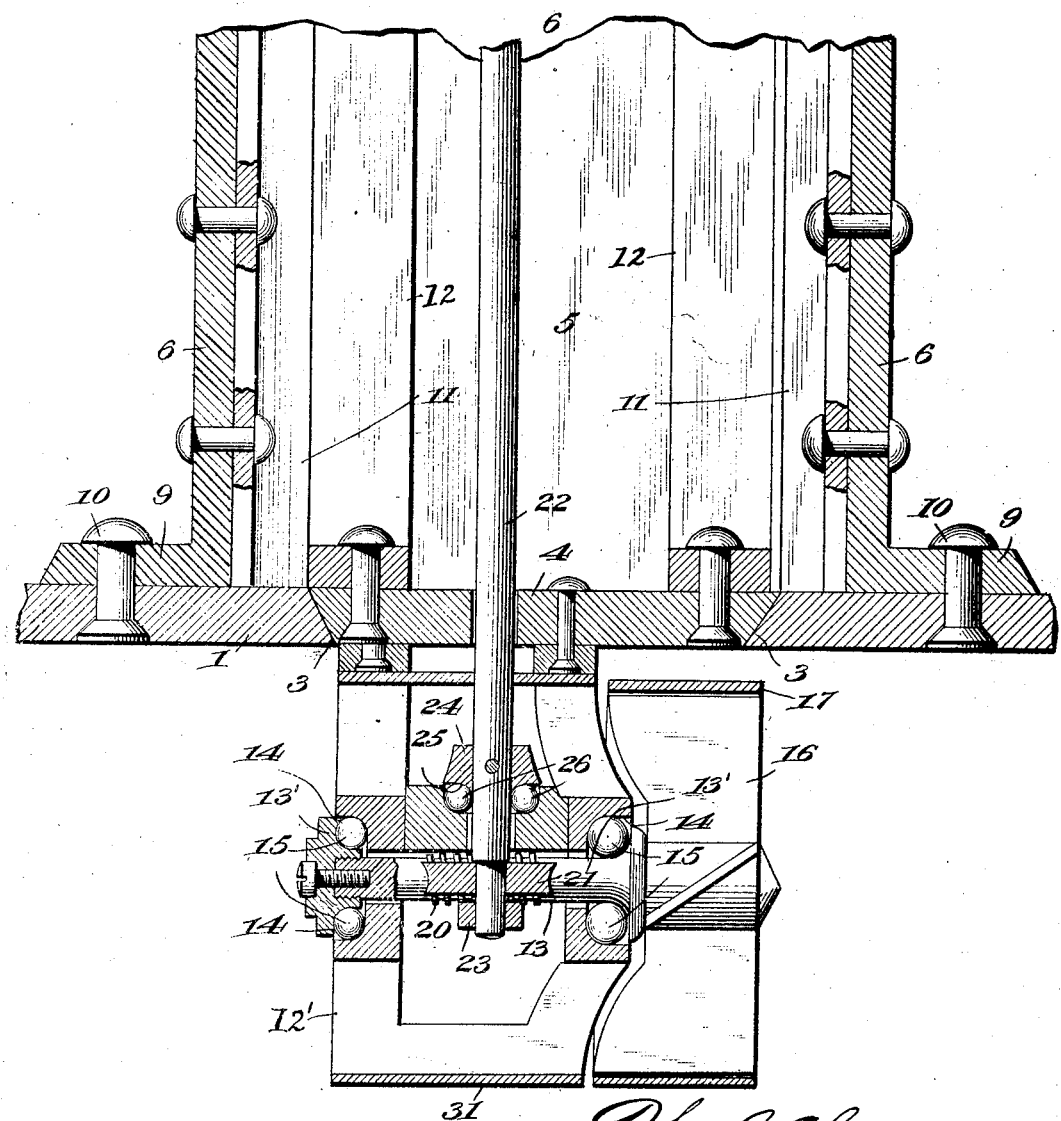

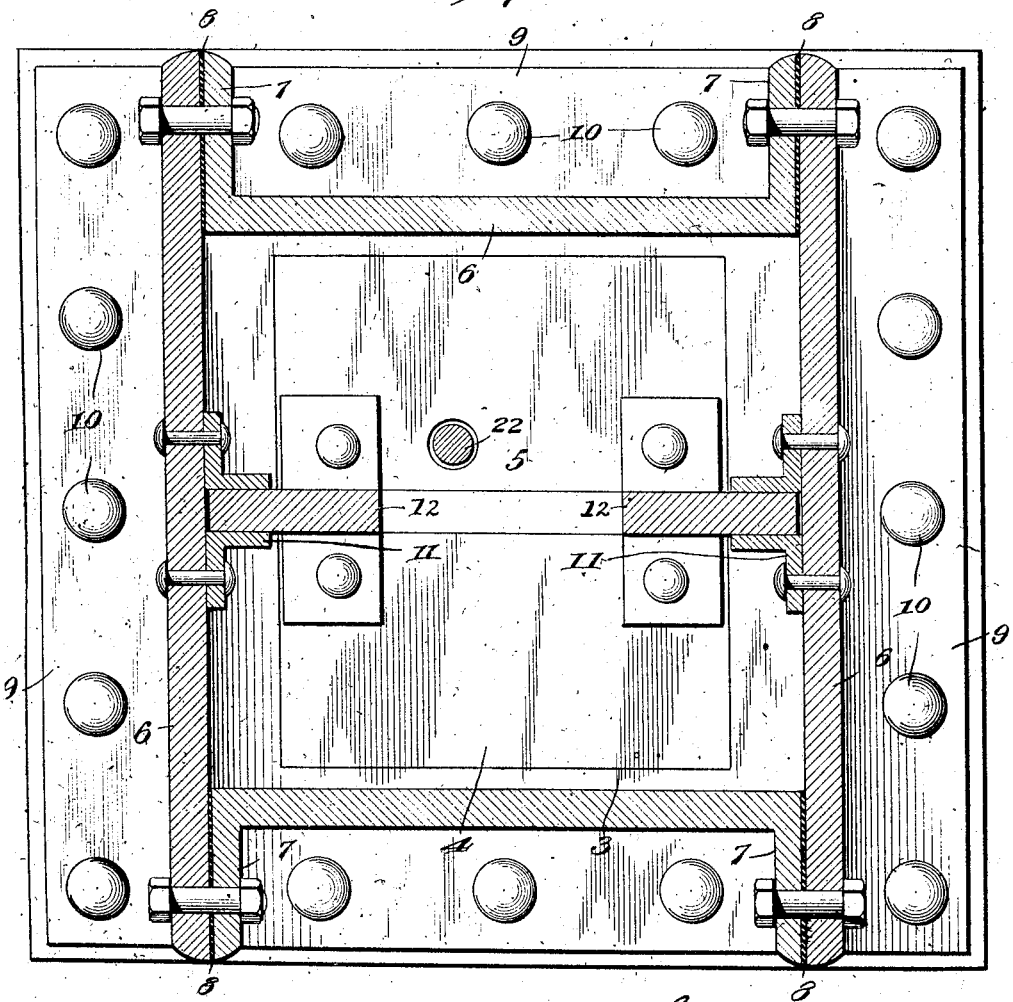

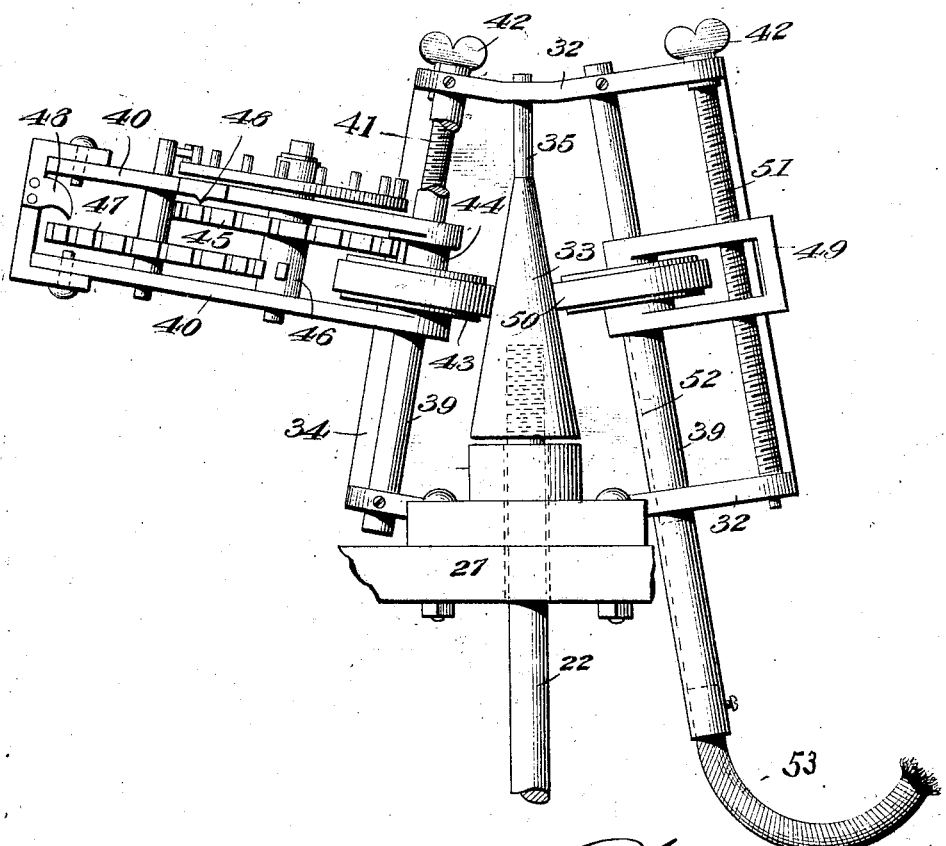

UNITED STATES PATENT OFFICE.

WILLIAM JEFFERSON CHANCE, OF DAWSON, YUKON TERRITORY, CANADA.

NAVIGATION APPARATUS.

938,972.   Specification of Letters Patent.   Patented Nov. 2, 1909.

Application filed July 15, 1907. Serial No. 383,791.

*To all whom it may concern:*

Be it known that I, WILLIAM J. CHANCE, a citizen of the Dominion of Canada, residing at Dawson, in the Yukon Territory and Dominion of Canada, have invented certain new and useful Improvements in Navigation Apparatus, of which the following is a specification.

My invention relates to improvements in navigating apparatus, and has for its object the provision of a device which will show at any time the exact compass location of the vessel, the direction in which it is traveling and if desired the rate of speed.

Another object of my invention is the provision of a device of this character which in addition to the above will keep a complete record of the voyage, showing the number of statute and nautical miles traversed, the direction, and approximate location of the vessel at all times during the trip.

A further object of the invention is the provision of a nautical device which will assist in the navigation of the ship so that the passage may be made in dark or foggy weather without requiring the exercise of any special skill, and which by reason of its continuous record will provide a check for the master of the ship or the person in charge to ascertain whether the course has been deviated from.

With these and other objects in view my invention consists of a motive apparatus controlled by the ship's progress, indicating and recording apparatus, and connections for imparting the proper movement to the indicating and recording apparatus from the motive power.

In addition to this, the invention comprises a nautical indicating and recording apparatus embodying certain other novel features of construction, combination and arrangement of parts substantially as disclosed herein and as illustrated in the accompanying drawings, in which:

Figure 1, is a broken side elevation, partly in section of the various parts constituting the apparatus. Fig. 2 is a detail sectional view of the propeller mechanism and the supports for the same. Fig. 3, is a cross sectional view of the well which extends up from the bottom of the ship. Fig. 4, is a detail enlarged broken view of the upper end of the driving shaft and the connections therefrom. Fig. 5, is a top plan view of the recording and indicating portion of the apparatus.

In the drawings, the numeral 1, designates the bottom of the vessel which is provided with an opening therein, the edges of the opening being set at an incline as at 3. A trap door 4, having similarly inclined edges is adapted to form a closure to the opening in the ship's bottom, and a well or inclosure 5, surrounds the opening, extending well above water line. This well may be made in the form of a continuous hollow column, or as shown in the drawings, it may be made of separate longitudinal side plates 6, having flanged edges 7, which are secured together by bolts or other suitable fastenings, there being packing 8, of rubber or other suitable material preferably interposed between the joints of the well or casing to render it perfectly water tight.

The foot of the well is preferably flanged as at 9, for intimate contact with the bottom plates of the vessel and fastening bolts or rivets 10, are passed through this flanged lower edge to secure the casing in position. Longitudinal guides 11, are secured on the opposite interior walls of the casing, between which guides are slidably confined the upright supporting bars 12, which at their lower ends are mounted upon and secured to the closure 4, these upright bars serving as guides and supports for elevating and lowering the trap door with its appendant parts. This elevating mechanism may be operated by any suitable means.

Depending from the lower face of the trap door or closure, is a frame 12', in which is journaled the horizontal shaft 13, the shaft being arranged parallel to the keel of the vessel. In order to reduce the friction to a minimum, cones 13', are preferably mounted on the ends of the shaft, and ball races 14, are formed in the standards of the supporting frame, balls 15, being confined in the ball races. A screw propeller 16, is mounted on the forward end of the horizontal shaft and a protection band or rim 17, preferably is carried by and surrounds the blades of the wheel. This propeller is actuated by the movement of the vessel through the water, at a speed dependent upon the speed of the vessel. The upper end of the casing is also preferably flanged as at 18, and connected directly to the main deck 19, of the vessel. A worm gear 20, is arranged upon the horizontal shaft 13, which meshes with and serves to drive the pinion 21, fixedly engaged on the lower end of the vertical transmission shaft 22. The extreme lower end of the vertical shaft is journaled in the supporting bar 23, and a cone collar 24, is engaged upon the vertical shaft between which and the ball race 25, are confined the balls 26, the whole serving as a thrust bearing for the support of the shaft. The transmission shaft extends up through the deck 27, and a ball-race plate 28, is mounted upon the deck which in combination with the balls 29, and the cone collar 30, on the shaft, forms a ball bearing for the upper end of the shaft. The vertical shaft is thus entirely supported on ball bearings and is therefore practically frictionless in operation. The ratio of gearing between the worm gear on the horizontal propeller shaft and the pinion on the vertical shaft, and the pitch of the propeller, is preferably such that the propeller rotates at the rate of 2662 revolutions per mile, and the vertical transmission shaft about 228 revolutions per mile. In order to protect the bearings for the propeller shaft and the gearing mechanism, these parts are preferably inclosed in a casing 31.

The vertical shaft is preferably extended above the deck up through the table or support 32. A friction cone 33, is threaded, keyed or otherwise secured upon the upper extended end of the vertical shaft. A frame 34, surrounds the friction cone on the upper end of the shaft, and the upper reduced end 35, of said cone is journaled in the upper portion of this frame. Supporting rods 39, are mounted in this frame parallel to the face of the friction cone and on opposite sides thereof, and on these rods are supported the friction elements for operating the recording mechanisms. A dial frame 40, has one of its ends slidably engaged upon one of the supporting rods 39, (the one at the left) and a screw rod 41, journaled in the frame 34, and passing through the dial frame, serves to raise and lower the dial frame on the supporting rod. The upper end of the adjusting screw 41, is provided with a finger hold or wing nut extension 42, for the convenient operation of the same.

Journaled upon the supporting rod and confined between the sides of the dial frame, is the friction wheel 43, having a friction rim of rubber or other similar material to contact with and be driven by the friction cone. A tappet 44, carried by the friction wheel, engages and rotates the dial 45, journaled in the dial frame, and this dial carries a tappet 46, which serves to transmit intermittent rotation to a second dial 47. The dials are graduated or marked upon their upper face, the first dial being preferably laid off to represent from one-half to ten miles in divisions of half mile each; and the second dial being graduated to represent two hundred miles in units of ten miles each. The dials are thus in the nature of an odometer to register the distance traversed by the vessel. Pointers 48, to each dial serve as an index to such dial in reading the same. The distance registering mechanism is thrown into and out of operation or the speed of rotation is changed by operating the thumb screw to raise and lower the dial frame and cause operative engagement of the friction roller with the friction cone. By means of these thumb screw adjustments for regulating the speed of the driven friction elements with respect to the driving element, allowance may be made for loss or gain due to windage and tide. By changing the number of dials and the graduations thereon the registering capacity of the instrument may be arranged to suit.

A hollow casing 49, or frame in the form of a loop, is slidably mounted on the opposite guiding and supporting rod 39, and on said rod between the open ends of the loop frame, is journaled the friction faced roller 50, which contacts with and is driven by the friction cone. This friction pulley frame is also raised and lowered in the manner just described by means of the screw post or rod 51, and the speed of the friction roller may thus be properly regulated. A sleeve 52, is affixed to the friction roller 50, and to said sleeve is secured the flexible shafting 53, which serves to transmit power to the mechanism for tracing the course of the vessel.

The mechanism for tracing the position of the ship and its course or progress, comprises a compass 54, of usual construction and mounted or swiveled in the usual way. Rising from opposite sides of the bowl of the compass, are the standards or posts 55, which form journal brackets or supports for the screw threaded rod 56, and to one end of this rod is attached the flexible driving connection 53, so that the threaded shaft or rod is rotated at a speed proportionate to the speed of the vessel. A guide bar 57, is also supported on the brackets 55, parallel and adjacent to the screw shaft 56. A plate 58, has its one end slidably engaged on the guide bar 57, and this plate extends over and beyond the screw shaft, the plate having a tooth or teeth 59, on its lower face for meshing engagement with the threads of the screw shaft, so that as the screw shaft rotates, the supporting plate is caused to travel across the face of the compass. The supporting plate or carrier has a depending extension 60, to which is adjustably clamped by means of the set screw or nut 61, the pointer or pen 62.

Upon the face of the compass disk 63, is secured the chart 64, this chart being laid off in degrees of latitude and longitude and common to the use of mariners. When it is desired to keep a permanent record of the voyage, the pen may be supplied with ink from the reservoir or ink well 65, supported on the carrier, and the pen will then trace off the actual course of the vessel upon the chart.

The operation of the device is as follows: The propeller is rotated by the action of the water at a rate according to the speed of the vessel. This motion is transmitted by suitable reduction gearing to the transmission shaft which carries the friction cone. The friction rollers are adjustably mounted in operative engagement with the friction cone, one of the so-called friction elements serving to operate the distance recorder which may be graduated to show the distance traversed in nautical or statute miles, or both. The other friction element serves to rotate a screw shaft which carries a carriage across the face of the compass at a rate proportionate to the speed of the vessel.

As before stated, additional frictional elements may be interposed to operate a speedometer or other like instrument. A mariner's chart graduated to degrees of latitude and longitude is carried on the face of the compass, the chart having the proper course traced thereon. A pen or pointer carried by the movable carriage indicates on the chart when the true course is being followed. The friction driving element for the tracing mechanism is adjusted so that as the vessel advances one mile, a like proportionate distance is traversed by the pen across the compass chart and the pen thus indicates on the chart the exact location of the vessel at all times, with respect to the latitude and longitude. It thus is only necessary for the steersman to hold the vessel so that the pointer follows the course indicated on the chart, and as the proportionate rate of the vessel and the pointer is the same, the true course may be adhered to without requiring observations of the sun or noting the position of surrounding objects. As the distance between the degrees of latitude and longitude vary, it is sometimes necessary to adjust the movable driving element for the tracing mechanism with respect to the driving cone, so that the proportionate speed of the vessel and tracing apparatus shall always be the same. It will thus be evident that an ordinary person may be able with the use of this device to navigate a vessel over a desired course without the exercise of any special skill, more than to steer the vessel according to the indications of the pointer.

With the use of this instrument, it is not necessary to "take the sun" or to make nautical calculations as to the position of the vessel in longitude and latitude, as at any time such location may be determined by reference to the position of the pointer on the chart, and the distance traversed may be ascertained equally as well by reference to the distance registering mechanism. By adjusting the inking needle the exact course will be actually traced off on the chart and this will prove a check to show whether the helmsman has been following the true course. For the sake of convenience, as many of the indicators may be installed in the vessel as desired and in any preferred positions.

It will be evident that my invention may be applied equally as well to air ships, submarines and vessels of different character, or by slight modifications, the principles involved could be applied to land vehicles.

The invention is particularly useful for surveying purposes, following the coastline for instance. In such case a blank chart laid off in the proper degrees of latitude and longitude would be engaged on the compass disk, the inking needle be adjusted, and as the vessel proceeds, the course of the same would be duplicated on the chart, to serve for future reference.

From the foregoing description taken in connection with the drawings, the operation and advantages of my improved nautical recording apparatus will be readily understood and appreciated and it will be apparent that I have produced such a device, accomplishing all the results herein set forth as the objects of the invention, which is efficient, practical and satisfactory in every particular.

I claim:

1. The combination with the vessel, of a motor operated by the movement of the vessel, a shaft driven from the motor, a compass, a carriage mounted for travel above the face of the compass and carrying a recording member, a screw shaft for imparting motion to the carriage, and connections between said screw shaft and the driven shaft.

2. Navigation apparatus, comprising a water motor operated by the movement of the vessel, a driving shaft rotated from said motor, a driving element on said shaft, driven elements adjustably connected with said driving element, a compass, a screw shaft mounted above the face of the compass, flexible driving connections between the screw shaft and one of the driven elements, a carriage mounted above the face of the compass and propelled by the screw shaft, recording means carried by the carriage and distance registering mechanism having connection with one of the other driven elements.

3. Navigation apparatus, comprising a water motor and a driving shaft operated thereby, a friction cone on the driving shaft, driven elements mounted for contact with the friction cone, registering mechanism operated by one of the driven elements, a compass and supports mounted above the face thereof, a carriage mounted upon the supports and propelled by rotation of one of said supports, driving connections between the rotatory support and one of the driven elements, and recording means carried by the carriage.

4. A vessel having a well extending up through the bottom thereof, a water motor, a shaft driven by said motor extending up through the well, a friction cone on the upper end of the shaft, a frame adjacent said cone, rollers journaled in said frame to engage the cone, means for adjusting the rollers with respect to the cone, registering mechanism operated by one of the rollers, a compass, supports upstanding from the bowl of the compass, a screw shaft journaled in said supports, a carriage supported on said shaft, a pointer carried by said carriage, and connections between the screw shaft and one of the rollers.

In testimony whereof I affix my signature in presence of two witnesses.

WILLIAM JEFFERSON CHANCE.

Witnesses:
ETTA DE PENCIER,
FRED. G. CRISP.